US006367365B1

(12) United States Patent
Weickert et al.

(10) Patent No.: US 6,367,365 B1
(45) Date of Patent: Apr. 9, 2002

(54) HYDRAULIC CIRCUIT

(75) Inventors: Thomas Weickert, Karsbach; Erich Adlon, Wiesthal, both of (DE)

(73) Assignee: Mannesmann Rexroth AG, Lohr (DE)

( * ) Notice: Subject to any disclaimer, the term of this patent is extended or adjusted under 35 U.S.C. 154(b) by 0 days.

(21) Appl. No.: 09/720,484

(22) PCT Filed: May 31, 1999

(86) PCT No.: PCT/DE99/01591

§ 371 Date: Jun. 4, 2001

§ 102(e) Date: Jun. 4, 2001

(87) PCT Pub. No.: WO00/00747

PCT Pub. Date: Jan. 6, 2000

(30) Foreign Application Priority Data

Jun. 29, 1998 (DE) ........................................ 198 28 963

(51) Int. Cl.[7] .......................... F15B 11/08; F16D 31/02

(52) U.S. Cl. ........................................... 91/447; 60/422

(58) Field of Search .......................... 60/422, 426, 494; 91/446, 447, 448

(56) References Cited

U.S. PATENT DOCUMENTS 4,002,220 A * 1/1977 Wible ...................... 60/422 X
RE30,403 E * 9/1980 Bitonti ..................... 91/447 X
5,182,909 A * 2/1993 Stellwagen .................. 60/426
5,209,063 A * 5/1993 Shirai et al .................... 60/422
5,271,227 A * 12/1993 Akiyama et al. ............. 60/422
5,813,311 A * 9/1998 Toyooka et al. .......... 60/422 X
6,289,675 B1 * 9/2001 Herfs et al. .................. 60/422

FOREIGN PATENT DOCUMENTS

| | | | |
|---|---|---|---|
| DE | 20 59 556 | A | 6/1972 |
| DE | 28 00 814 | A1 | 7/1979 |
| DE | 40 27 047 | A1 | 3/1992 |
| DE | 41 22 164 | C1 | 1/1993 |
| DE | 42 34 036 | A1 | 4/1994 |
| DE | 196 46 427 | A1 | 5/1998 |
| EP | 0 284 831 | A | 10/1988 |
| EP | 0 566 449 | A1 | 10/1993 |
| WO | WO 95/32364 | | 11/1995 |

* cited by examiner

*Primary Examiner*—John E. Ryznic
(74) *Attorney, Agent, or Firm*—Oliff & Berridge, PLC

(57) ABSTRACT

An LUDV-circuit for controlling at least one of a lower-load consumer and a higher-load consumer is disclosed, wherein a metering orifice and a downstream pressure compensator for maintaining constant the pressure drop across the metering orifice constant are associated with each consumer. The pressure compensator of the lower-load consumer is associated with a bypass channel capable of being controlled open, whereby the pressure compensator of this consumer may be bypassed.

9 Claims, 4 Drawing Sheets

HYDRAULIC CIRCUIT

The invention relates to a hydraulic circuit for controlling at least one lower-load consumer and one higher-load consumer in accordance with the preamble of claim 1.

Such circuits (also termed load-sensing circuits) are i.a. used for controlling mobile machines, for example excavators. By means of the central circuit, hydraulically actuated units of the machine, for example a rotating mechanism, the travelling mechanism, a shovel, an arm or clamping means mounted on the excavator boom are controlled.

A load-sensing circuit of this type is, for example, known from EP 0 566 449 AS. This circuit includes a variable displacement pump which may be controlled such as to generate at its output a pressure which exceeds the highest load pressure of the hydraulic consumer by a specific differential amount. For the purpose of regulation a load-sensing regulator is provided which may receive application of the pump pressure in the direction of reducing the stroke volume, and the highest pressure at the consumers, as well as a pressure spring in the direction of increasing the stroke volume. The difference between the pump pressure and the highest load pressure which occurs in the variable displacement pump corresponds to the force of the aforementioned pressure spring.

To each one of the consumers an adjustable metering orifice including a pressure compensator arranged downstream thereof is associated, whereby the pressure drop at the metering orifice is maintained constant, so that the amount of hydraulic fluid flowing to the respective consumer depends not on the load pressure of the consumer or the pump pressure but on the cross-section of opening of the metering orifice. In the case in which the variable displacement pump conveys at maximum volume while the hydraulic fluid flow nevertheless is not sufficient for maintaining the predetermined pressure drop across the metering orifices, the pressure compensators of all actuated hydraulic consumers are adjusted in a closing direction, so that any flow of hydraulic fluid to the individual consumers is reduced by an identical proportion. Namely, in the case of a downstream pressure compensator, the volume flows towards the consumers will always be proportional with the cross-section of opening of the metering orifices. Owing to this load-independent throughput distribution (LUDV), all controlled consumers move with a velocity reduced by an identical percentage.

The variable displacement pump mentioned at the outset is customarily equipped with a pressure control and with a power control whereby the maximum possible pump pressure or the maximum power capable of being output by the variable displacement pump (excavator power), respectively, may be adjusted. These pressure and power controls are superseded to the load-sensing regulation.

In the case of a control arrangement of the above described type, problems may occur when a hydraulic consumer works against a practically infinite resistance. This may, for example, be the case if the hydraulic consumer is a shovel being actuated against a stop. In the case of actuation against a stop, a pressure about corresponding to the maximum pressure (excavator power) predetermined by the pressure control builds up at the corresponding hydraulic consumer. If, now, an additional hydraulic consumer, for example a travelling mechanism or a boom is activated, the latter may only be displaced with a lower velocity, for owing to the high pressure at the former consumer (shovel), the power control of the variable displacement pump already responds at low flows of hydraulic fluid to the other hydraulic consumer (travelling mechanism).

In order to eliminate this drawback, a control arrangement is disclosed in WO95/32364 to the same applicant, by means of which only the load pressure of the lower-load hydraulic consumer is reported to the load-sensing regulator of the variable displacement pump when a limit load pressure is exceeded. This limit load pressure is selected such that the supply for the additional hydraulic consumer is ensured. In the subject matter of WO95/32364 this is achieved in that the spring cavity of the pressure compensator of the lower-load consumer may be connected to the reservoir via a pressure control valve arrangement. When a limit load pressure is exceeded, the pressure control valve opens the connection to the reservoir, so that the spring cavity of the pressure compensator of the lower-load consumer is relieved of pressure, and the control piston is taken into its open position wherein the load pressure of this consumer is reported in the load pressure reporting line.

It is a drawback in this control arrangement that a partial volume flow is discharged towards the reservoir and thus is not available for consumer control. The efficiency of this control is accordingly comparatively low. It is another drawback that owing to hydraulic fluid being returned towards the reservoir, heat is generated in the system and thus pump power is dissipated.

In contrast, the invention is based on the object of furnishing a control arrangement whereby sufficient supply of all consumers is ensured at minimum expense in terms of device technology.

This object is attained through a hydraulic circuit having the features of claim 1.

Owing to the measure of providing a bypass channel through which the pressure compensator downstream from the metering orifice may be bypassed, it is not necessary to establish a lower setting of the pressure compensator, or discharge hydraulic fluid into the reservoir in order to limit the system pressure. The manifesting system pressure may be predetermined by corresponding selection of the bypass cross-section. On account of the reduced system pressure, the lower-load consumer may be supplied with a greater amount of hydraulic fluid which may be utilized, for example, for increasing a velocity of a boom or the like.

A circuit having a particularly simple construction is obtained if the metering orifice upstream from the pressure compensator is formed by a proportional directional control valve, with the bypass channel being capable of being controlled open in accordance with the valve spool position of the proportional directional control valve. Due to the fact that the bypass channel is controlled open in dependence on control of the proportional valve, the individual-pressure compensator acts merely in the fine control range where comparatively low hydraulic fluid volume flows pass through the pressure compensator.

The construction may be simplified further if the bypass channel is formed in the valve spool of the proportional directional control valve and may be controlled open by a control land of the valve spool bore.

In order to prevent return flow from the consumer through the bypass channel, a check valve arrangement is provided in the latter.

In a preferred variant of the invention, two work ports of a consumer are controlled through the proportional valve. In some cases, e.g., in the case of double-action hydraulic cylinders, it is sufficient if the bypass channel is associated with only one of the work ports, so that a flow through the bypass takes place, for example in the lifting function. It is, of course, also possible to associate bypass channels to both work ports.

As was already mentioned above, it may be advantageous if the bypass channel is controlled open only following a specific stroke of the proportional valve, so that no bypass flow is engendered at the beginning of the control.

The valve spool of the proportional directional control valve is preferably designed to include a central velocity component and two external directional components each associated with one port of the consumer. The bypass channel in this case extends inside the valve spool from the velocity component towards the directional component, so that the pressure compensator is bypassed.

The pressure loss in the bypass channel may be minimized if the latter has oblique and radial bores opening into the outer periphery of the valve spool.

Other advantageous developments of the invention are subject matters of the further appended claims.

In the following, preferred embodiments of the invention shall be explained in more detail by referring to schematic drawings, wherein.

Figure 1:
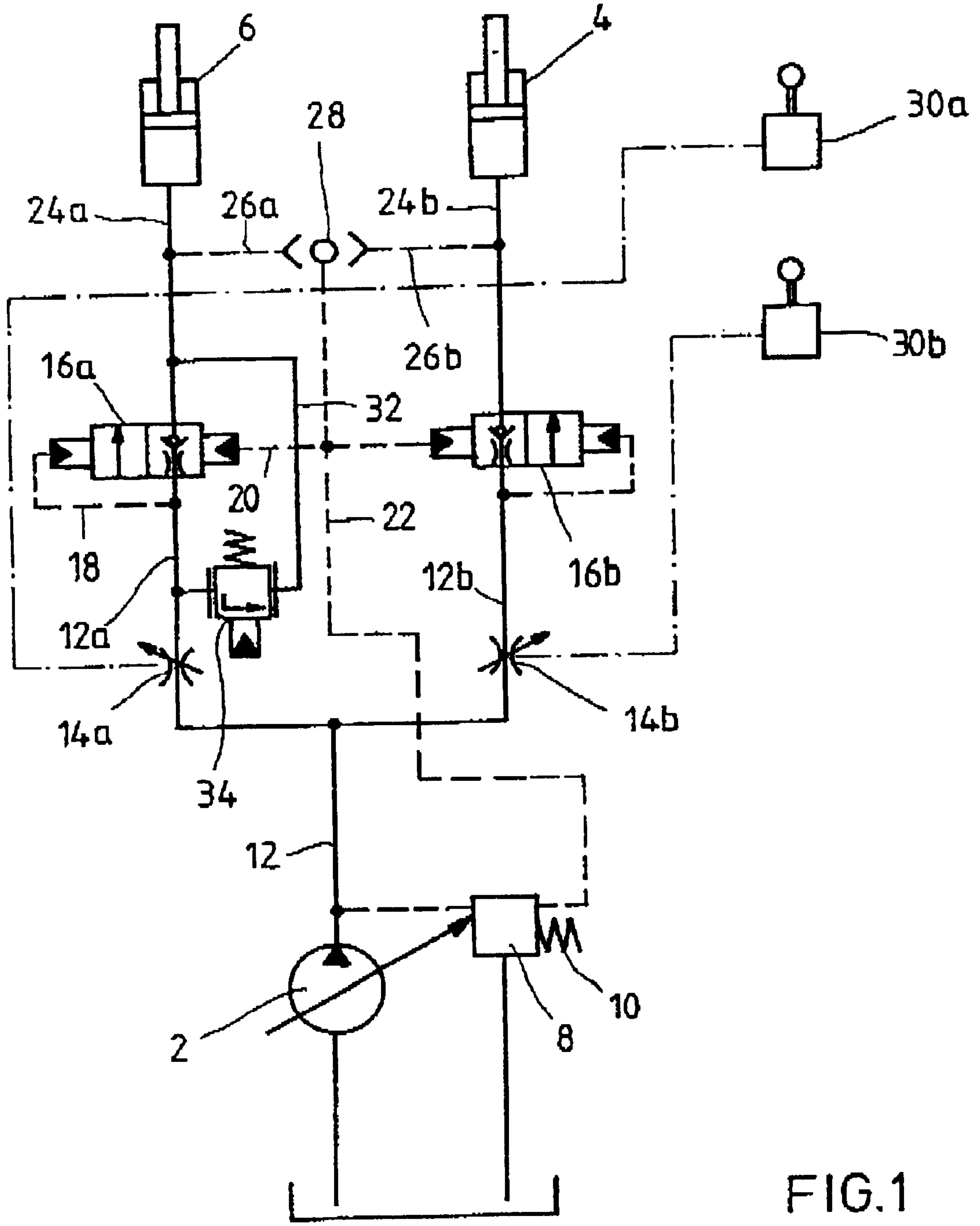
FIG. 1 is a switching diagram of a circuit according to the invention which includes a bypass channel.

In FIG. 1, a part of a switching diagram for a hydraulic circuit for controlling a mobile work tool, e.g. an excavator, is represented. This excavator has several consumers such as, for example, a boom, a shovel, an excavator arm, a travelling mechanism drive and a rotating mechanism drive, which are supplied with hydraulic fluid by a variable displacement pump 2. In the embodiment represented in FIG. 1, a cylinder 4 for actuation of a shovel and a cylinder 6 for actuation of the excavator boom are represented as consumers.

An adjustment of the stroke volume of the variable displacement pump is carried out by means of a load-sensing regulator 8 which regulates the stroke volume of the variable displacement pump as a function of the pump pressure on the one hand, and of the highest load pressure at the consumers 4, 6 and the force of a pressure spring 10 on the other hand. The hydraulic fluid supplied by the variable displacement pump is conveyed to the two consumers 4 and 6, respectively, via a pump line 12 including branch lines 12*a*, 12*b*.

In each branch of the pump line 12 (12*a*, 12*b*) an adjustable metering orifice 14*a*, 14*b* is formed. As shall be explained in more detail, these metering orifices 14*a*, 14*b* are designed as velocity components of a proportional valve.

Downstream from each metering orifice 14*a*, 14*b*, one respective pressure compensator 16*a*, 16*b* is arranged. The control piston of these 2-way pressure compensators receives the pressure downstream from the metering orifice 14*a*, 14*b* in an opening direction via a control line 18, and the highest load pressure tapped by a load pressure reporting line 22 in a closing direction via a load control line 20. Through the latter, the highest load pressure is also passed on to the load-sensing regulator 8.

From the output port of the pressure compensator 16*a*, 16*b* a work line 24*a*, 24*b* leads to the respective consumers 4 and 6. The load pressure of the consumers 4, 6 is tapped via branch lines 26*a*, 26*b* and passed on to a shuttle valve 28 having its output connected to the load pressure reporting line 22.

Control of the adjustable metering orifices 14*a*, 14*b* is achieved through manually operable control means 30*a*, 30*b* which are in operative connection with the metering orifices 14*a* and 14*b*, respectively.

Thanks to a circuit of the above described type a classical "LUDV" circuit is realized, wherein the pressure drop across the metering orifices 14*a*, 14*b* is maintained constant independent of load pressure with the aid of pressure compensators 16*a*, 16*b*. When the full pump performance is exhausted, the settings of both pressure compensators 16*a*, 16*b* customarily are reduced, so that the hydraulic fluid volume flow towards the two consumers 4, 6 is reduced by an identical percentage. As was already described at the outset, a problem may occur in these circuits whenever the higher-load consumer (shovel 4) is actuated against a stop, so that the load pressure of this consumer is located in the range of the maximum pump pressure. If, now, an additional lower-load consumer is added on, the volume flow of the lower-load consumer subsides to a value which is predetermined by the maximum pump capacity. A large part of the power is dissipated in the reducing pressure compensator of this consumer.

In order to prevent this, a bypass channel 32 allowing for bypassing the pressure compensator 16*a* is associated to the lower-load consumer b in the control represented in FIG. 1. The bypass channel 32 branches off downstream from the metering orifice 14*a* and opens into the work line 24*a* towards the consumer 6. Inside the bypass channel 32, suitable control means 34 are provided which block the bypass channel 32 in the basic position and control it open in dependence on the cross-section of opening of the metering orifice 14*a*. On account of this circuit, the hydraulic fluid volume flow towards the consumer 6 is not reduced by the pressure compensator 16*a*, so that a lower system pressure in comparison with a system without a bypass channel 32 will occur. This makes it possible to extend the boom 6 with a higher velocity. The switching means designated by reference numeral 34 may be any means suitable for blocking the bypass channel 32 and controlling it open in accordance with control of the metering orifice 14*a*.

Figure 2:
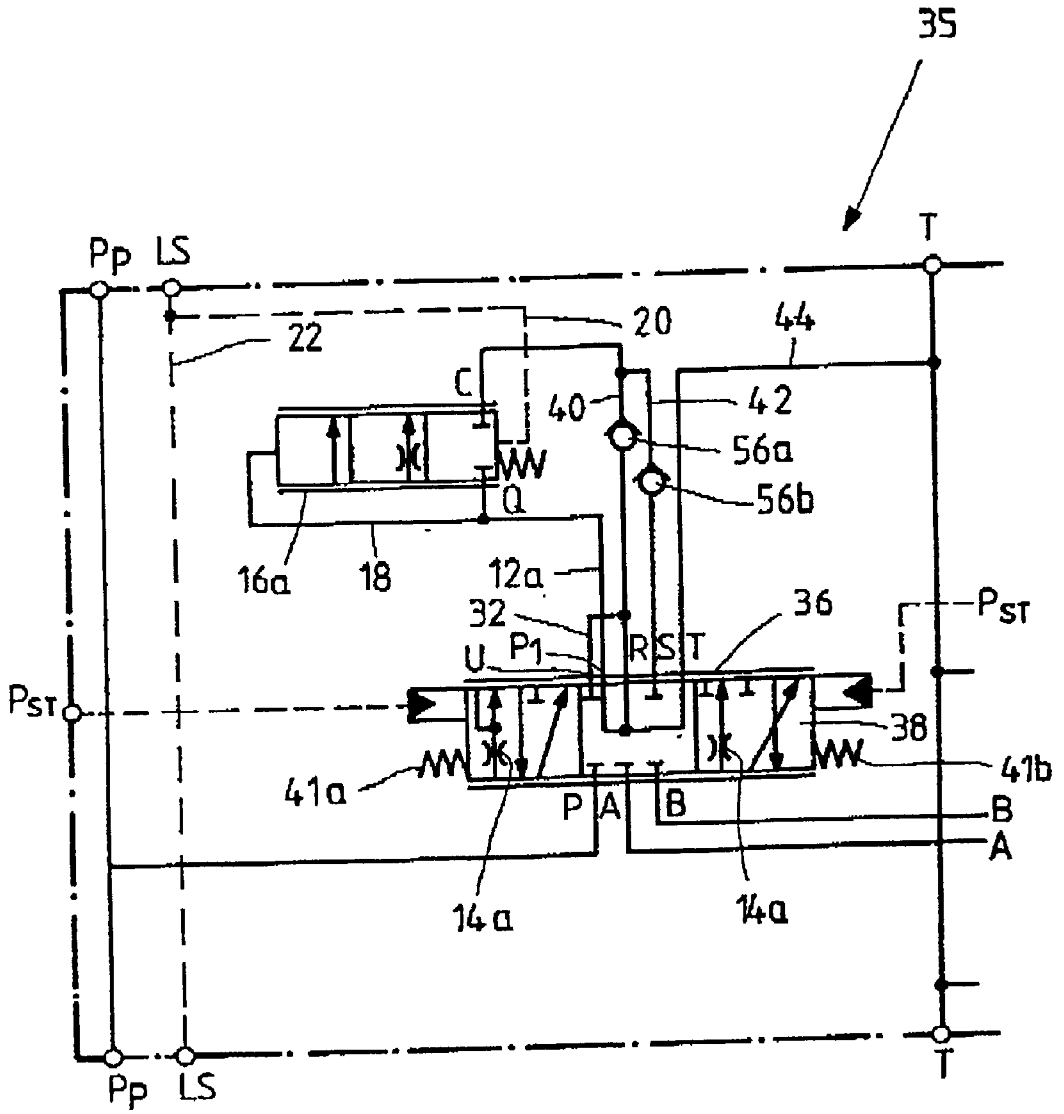
FIG. 2 shows a valve disc of a valve block for a circuit in accordance with FIG. 1.

In FIG. 2 the switching diagram of a valve disc 35 of a valve block for realizing the circuit depicted in FIG. 1 is represented. The valve disc 35 contains the pressure compensator 16*a*, a proportional valve 36 with a velocity component forming the metering orifice 14*a*, and the bypass channel 32, and the other connection lines of the hydraulic elements described in more detail in the following. In the embodiment represented in FIG. 2, a directional component for controlling the consumers A, B, as well as controlling the bypass channel 32 are furthermore integrated in the proportional valve 36 apart from the metering orifice 14*a*.

The proportional valve 36 includes a pump port P, two work ports A, B which are connected with the cylinder cavities of a differential cylinder b or with a hydraulic motor. In addition an output port P1 towards the pressure compensator 16*a*, a bypass port U, two input ports R, S of the directional component, and a reservoir port T are formed on the proportional valve 36.

The two front sides of the valve spool 38 of the proportional valve 36 are biased into their basic positions by two pressure springs 41*a*, 41*b*. In this basic position, the ports P, A, B, U and 5 are blocked while the ports P1 and R are connected to the reservoir.

The front surfaces of the valve spool 38 receive a control pressure $P_{ST}$ whereby it may be moved out of its spring-biased basic position.

The output port P1 is connected to the input port Q of the pressure compensator 16*a* via the pump line 12*a*. As was already explained above, there branches from the pump line 12*a* the control line 18 through which the pressure downstream from the metering orifice 14*a* (proportional valve 36) to the left-hand front side of the pressure compensator 16*a* in the representation of FIG. 2 is reported. The load pressure of the consumer 6 is connected with the load pressure reporting line 22 via the load reporting line 20 and conveyed to the spring side of the pressure compensator 16*a*. The output port C of the pressure compensator 16*a* is connected with the input ports R and S, respectively, of the directional component through lines 40, 42. Inside the lines 40, 42 there are two check valves 56*a*, 56*b* which prevent a return flow of the hydraulic fluid from the directional component towards the pressure compensator 16*a*.

The reservoir port T is connected to the reservoir through a reservoir line 44. With the aid of the pressure compensator 16*a*, the pressure drop across the metering orifice 14*a* is maintained constant independent of load when controlling the proportional valve 36, so that the volume flow towards the consumer 6 is proportional to the cross-section of opening of the metering orifice 14*a*.

When a control pressure $P_{ST}$ is applied, for example, to the left-hand front surface of the proportional valve 36, the valve spool 38 is displaced to the right, so that the metering orifice 14*a* is controlled open in order to connect the ports P, P1. In the fine control range, i.e. in the first part of the valve spool stroke, the connection towards the bypass channel port U is still blocked. The hydraulic fluid is conveyed via the work line 12*a* to the input port Q and via the control line 18 to the left-hand front side of the control piston of the pressure compensator 16*a*, so that the latter is shifted into its control position for maintaining the pressure drop across the metering orifice 14*a* constant.

The hydraulic fluid flow adjusted in this way is then conveyed via the line 40, the ports R, A to the work port of the consumer 6, while the hydraulic fluid is returned from the consumer 6 to the reservoir via the work port B and the reservoir line 44. Port S is closed.

When the metering orifice 14*a* is controlled open further, the bypass channel 32 is controlled open by the valve spool 38, so that the hydraulic fluid flows directly into the line 40. The volume flow towards the pressure compensator 16*a* is reduced or even blocked altogether, so that a higher volume flow is conveyed towards the consumer 6. This increase of the volume flow results in a dropping system pressure even when the higher-load consumer 4 is actuated against a stop.

Figure 3:
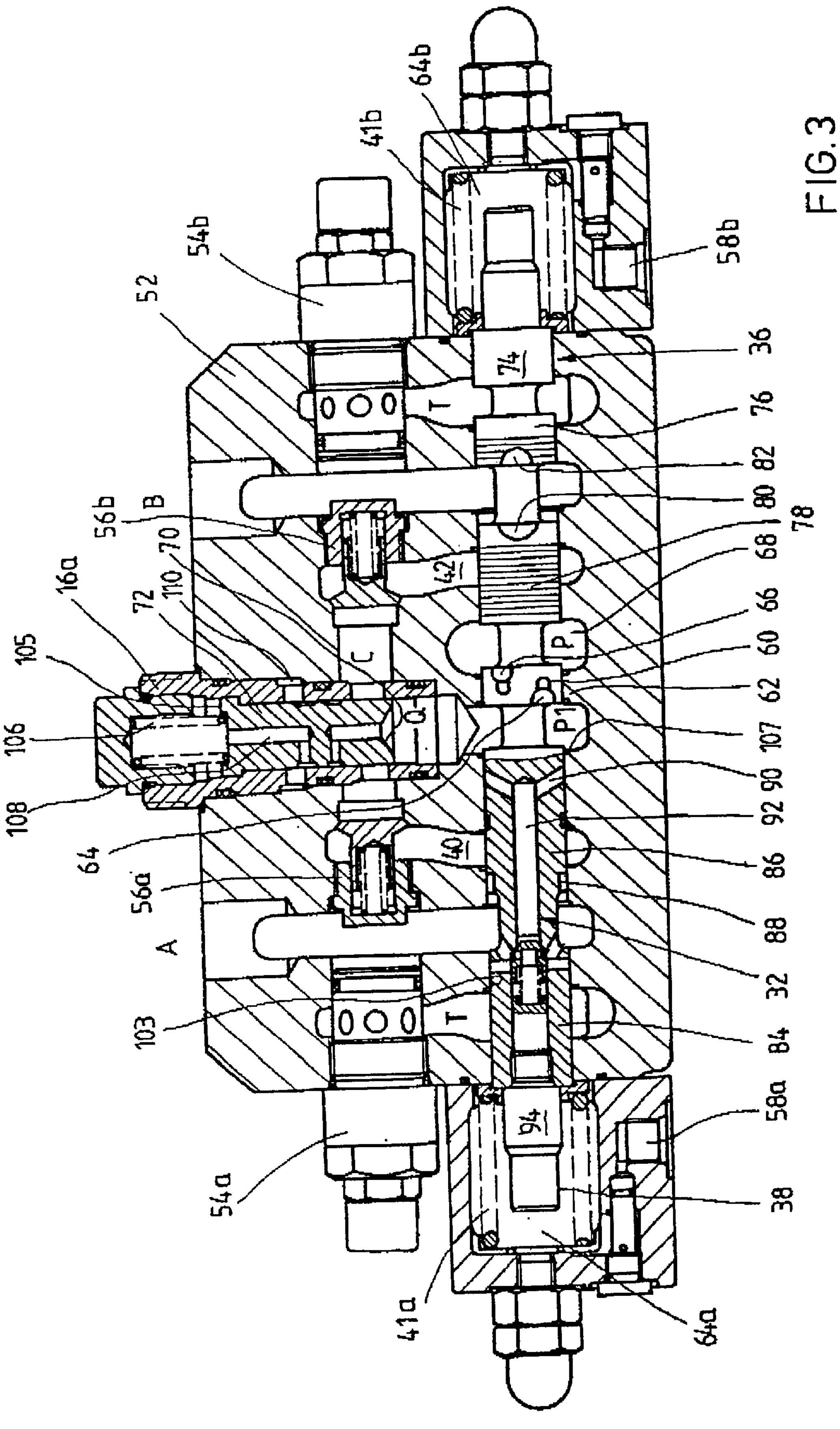
FIG. 3 is a sectional view of a valve segment for a circuit in accordance with FIG. 1.

FIG. 3 shows a sectional view of a directional control valve segment whereby the circuit represented in FIG. 2 is realized. The directional control valve segment includes a valve plate 52 wherein reception bores-for the valve spool 38, the pressure compensator 16*a*, two pressure control valves 54*a*, 54*b* and the two check valves, or load holding valves 56*a*, 56*b* are formed. In the valve plate 52, moreover, the two work ports A, B, two control ports 58*a*, 58*b* for controlling the proportional valve 36, a pump port P, at least one port for the load pressure reporting line 22, and a reservoir port are provided.

The fundamental construction of this directional control valve segment is already known from the prior art and is, e.g., described in the above mentioned WO95/32364.

The valve spool 38 has in its central range a control collar 60 forming the metering orifice 14*a* in co-operation with a land 62 of the valve bore. In the representation in accordance with FIG. 3, the valve spool 38 is biased by the two pressure springs 41*a*, 41*b* into its basic position wherein flow through the metering orifice 14*a* does not take place.

Controlling the proportional valve 36 is effected by applying a control pressure at the two control ports 58*a* and 58*b*, respectively, which are connected to the spring cavity 64*a* or 64*b*, respectively, of the proportional valve 36 via control lines. In the control line between the control ports 58*a*, 54*b* and the spring cavities 64*a* and 64*b*, respectively, a nozzle including a check valve is formed, enabling attenuation of the valve spool movement.

The control collar 60 is provided in the range of its front surfaces with a multiplicity of control notches 64 or 66, respectively, through which pressure medium may be conveyed from an annular chamber 68 connected with the pump port P to the input port Q, so that the pressure downstream from the metering orifice may be applied to the lower front surface of the control piston 72 of the pressure compensator 16*a* in the representation of FIG. 3.

Upon displacement of the directional control valve spool 38 to the right (FIG. 3), the metering orifice 14*a* is formed by co-operation of the control notches 64 with the one control land of the land 62, whereas upon a displacement to the left, the control notches 66 control the connection from the annular chamber 68 towards the pressure compensator 16*a* open.

The input port Q of the pressure compensator 16*a* is designed as an axial port, so that the fluid pressure also acts on the lower front surface 70 of the control piston 72. The output port C has the form of a radial port and opens into the lines 40 and 42, respectively. Inside these lines 40, 42 the load holding valves 56*a*, 56*b* are arranged which prevent a return flow from the valve spool 38 towards the pressure compensator 16*a* and enable flow in the opposite direction.

Connection of lines 40, 42 with the work ports A and B, respectively, or the reservoir port T is realized by means of a directional component of the valve spool 38. Namely, to each work port A, B a directional component is associated whereby the one work port A or B may be connected with a line 40, 42 or with the reservoir T.

The directional component for port B formed on the right side in the representation of FIG. 3 includes three control collars 74, 76 and 78 formed at an axial distance. The control collars 76 and 78 are each provided with a control notch 80 or 82, respectively, which open towards the radially stepped-back portion arranged between these control collars 76, 78.

The directional component of the valve spool 38, which is associated with work port A, is formed by two spaced control collars 84, 86 only. In control collar 86, control notches 88 are formed which functionally correspond to the control notches 80 of the control collar 78.

At the outer periphery at an axial distance from the right-hand front surface of the control collar 86, several oblique bores 90 open which are distributed over the periphery and connected with a common axial bore 92. The latter extends through the control collar 8 as far as the left-hand end portion of valve spool 38. In the represented variant, the limit atop 94 of the valve spool is screwed into the axial bore 92 so that the left-hand end portion thereof is closed.

Figure 4:
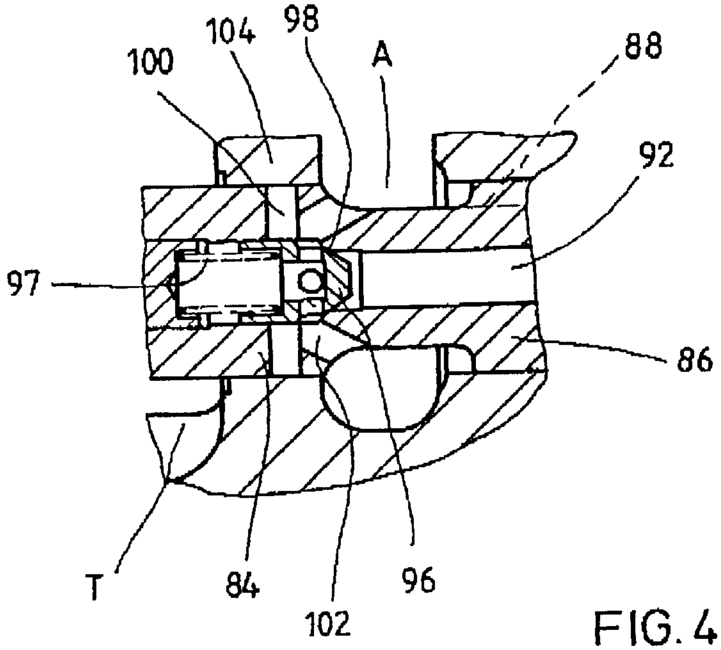
FIG. 4 is a detail representation of the valve segment of FIG. 3.

FIG. 4 shows a detail representation of the valve spool 38 in the central region of this axial bore 92.

Accordingly, in the axial bore 92 a retainer valve is provided, the valve body 96 of which is biased against a valve seat 98 by a pressure spring 97.

A radial bore star 100 and an oblique bore star 102 open downstream from the valve body 96. The radial bore star 100 is blocked by a land 104 of the reception bore 103 of valve spool 38. The oblique bore star 102 opens an the radially stepped-back portion between control collars 84 and 86. The valve body 96 biased against the valve seat 98 prevents inflow of hydraulic fluid from port A into the axial bore 92. Flow in the opposite direction is practically not prevented owing to the pressure spring 97 being weak.

The geometry of the radial bore star 100 and of the oblique bore star 102 is selected such that upon a displacement of valve spool 38 to the left, the connection from work port A to reservoir port T may be controlled open with the aid of these stars 100, 102. As an alternative it would, of course, also be possible to use control notches in the right-hand front surface range of the control collar 84 for controlling open.

If, now, a control pressure is applied to control port 58*a*, the valve spool 38 is displaced towards the right in the representation of FIG. 3, so that the control notches 64, in co-operation with land 62, control the connection from pump port P to the input port Q of the pressure compensator open.

The front surface 105 of the control piston 72 located on top in the representation of FIG. 3 receives the force of a control spring 106 and of a load pressure which is tapped via a control land and an angular bore 108 in the control piston 72 by a peripheral groove 110. Due to the pressure downstream from the metering orifice 14*a* applied to input port Q, the control piston 72 is displaced in an upward direction, and output port C is controlled open until an equilibrium of forces is realized above the control piston 72. The load holding valve 56*a* is opened, and the hydraulic fluid is conveyed through the line 40 and the control collar 86 including control notches 88 to work port A. At the same time, the connection between work port B and reservoir port T is controlled open above the control collar 76 associated with work port B and the control notches 82, so that the hydraulic fluid may flow back from the consumer into the reservoir. In this fine control range, the oblique bores 90 of the bypass channel 32 are not controlled open yet by the control land 107.

Upon further displacement of the valve spool 38, the control land 107 controls open the bypass channel 82, so that the hydraulic fluid or at least a partial volume flow is conveyed to work port A. The system pressure drops, so that the lower-load consumer 6 may be actuated with a higher velocity.

When the valve spool 38 is actuated in the reverse direction, the bypass channel has no function, for reverse flow from A to the input port Q of the pressure compensator 16*a* is prevented by the valve body 96 resting on the valve seat 98.

In the above described embodiment, the bypass channel 32 is only associated to the work port A which is required for the lifting function of the consumer. It is, of course, also possible to associate a further bypass channel with the other work port B, which further bypass channel would then have a construction identical with the one of the above described work port.

Figure 5:
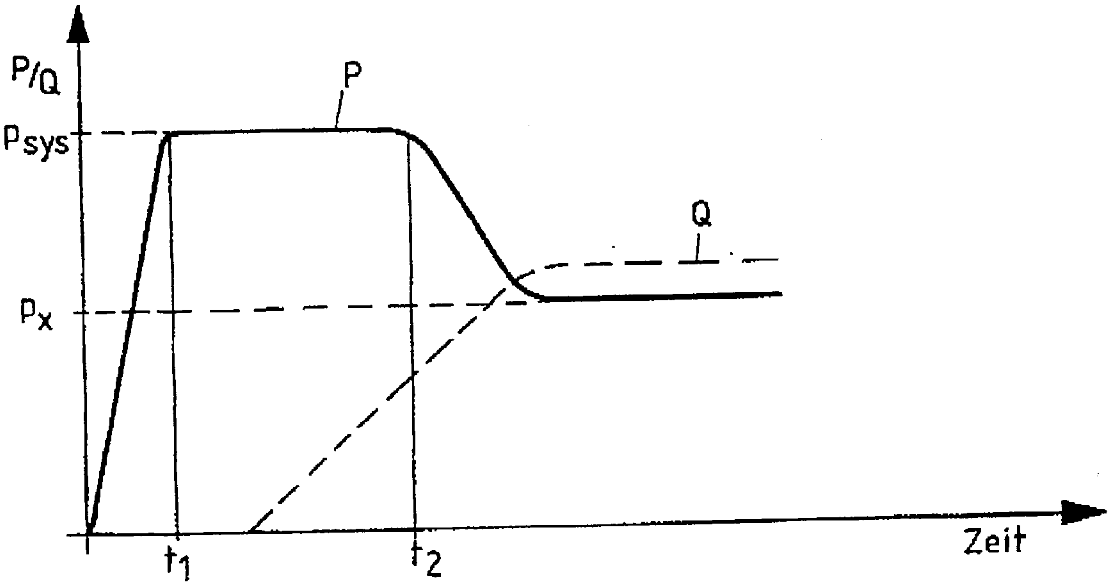
FIG. 5 is a diagram elucidating the system pressure structure in the cases of controlling a higher-load consumer and a lower-load consumer.

In the diagram in accordance with FIG. 5 the pressure and volume flow ratios of the above described processes are represented over time. It is assumed that initially a higher-load consumer, for example a shovel, is actuated against a stop. The corresponding pressure development is represented by continuous lines in FIG. 5. Accordingly, the load pressure at this consumer rises very quickly and reaches a maximum predetermined by the pump capacity $P_{sys}$ at the time t1.

After attaining this maximum pressure, a lower-load consumer, e.g. a boom, is controlled closed. In control of the proportional valve 36 associated with this consumer, the bypass channel 32 is controlled open in the above described manner, so that the hydraulic fluid flow Q to the lower-load consumer rises (dashed line). Owing to this rise of the hydraulic fluid volume flow to the lower-load consumer, the pressure drops from system pressure $p_{SYS}$ to a lower level p*. It is possible to adjust the pressure level p* through suitable selection of the bypass channel diameter, so that the pressure will, e.g., drop from a pressure of 240 bar to a pressure p* of 200 bar.

At the beginning of controlling the lower-load consumer, the pressure p will not be influenced as the bypass channel is not controlled open yet at the beginning of controlling.

The invention is, of course, in no way restricted to the bypass channel 32 being integrated in the proportional valve 36. Other solutions are equally conceivable, wherein the bypass channel is realized through external circuits.

What is disclosed is an LUDV-circuit for controlling at least one of a lower-load and a higher-load consumer, wherein a metering orifice and a downstream pressure compensator for maintaining constant the pressure drop across the metering orifice are associated with each consumer. The pressure compensator of the lower-load consumer is associated with a bypass channel capable of being controlled open, whereby the pressure compensator of this consumer may be bypassed.

What is claimed is:

1. A hydraulic circuit for controlling at least one of a lower-load consumer and a higher-load consumer (4, 6), including a variable displacement pump (2) the setting of which is variable as a function of the load pressure of the Consumers (4, 6), with an adjustable metering orifice (14*a,* 14*b*) comprising a downstream pressure compensator (16*a,* 16*b*) being provided between said variable displacement pump (2) and each consumer (4, 6), the control piston (72) of which may be acted on in a closing direction by the load pressure of the associated consumer (4, 6) and in an opening direction by the pressure downstream from said metering orifice (14*a,* 14*b*), characterized by a bypass channel (32) connecting the metering orifice output ($P_1$) with at least one work port (A) for the lower-load consumer (6) while bypassing said associated individual-pressure compensator (16*a*).

2. The hydraulic circuit in accordance with claim 1, characterized in that said metering orifice (14*a,* 14*b*) is formed by a proportional valve (36) whereby the work port (A, B) may be connected with said pump port (P) or a reservoir (T), and in that said bypass channel (32) may be controlled open in accordance with the valve spool position of said proportional valve (36).

3. The hydraulic circuit in accordance with claim 2, characterized in that said bypass channel (32) is formed in said valve spool (38) and may be controlled open by a control land of said proportional valve (36).

4. The hydraulic circuit in accordance with claim 1, characterized in that in said bypass channel (32) a check valve (96, 97, 98) is arranged which prevents a hydraulic fluid flow from said consumer (6) to said metering orifice (14*a*).

5. The hydraulic circuit in accordance with claim 2, characterized in that said proportional valve (36) includes two work ports (A, B) for said consumer (6), and in that a bypass channel (32) is associated to each work port (A, B).

6. The hydraulic circuit in accordance with claim 2, characterized in that said bypass channel (32) is controlled open only following a predetermined stroke of said valve spool (36).

7. The hydraulic circuit in accordance with claim 2, characterized in that said valve spool (38) includes a velocity component having an approximately central arrangement and forming said metering orifice (14*a*), as well as two directional components through which the hydraulic fluid may be conveyed from said output port (Q) of said pressure compensator (16*a*) to a work port (A, B) or from said other work port (A, B) to a reservoir port (T), respectively, wherein said bypass channel (32) extends from said velocity component to one of said directional components.

8. The hydraulic circuit in accordance with claim 4, characterized in that said bypass channel (32) opens via oblique bores (90) in the range of said velocity component on the one hand, and via a radial bore star (100) and/or an oblique bore star (102) downstream from said check valves (96, 97, 98) in the range of a directional component on the other hand.

9. The hydraulic circuit in accordance with claim 1, characterized in that said variable displacement pump (2) is pressure and power controlled.

* * * * *